(12) United States Patent
Nakamura et al.

(10) Patent No.: US 10,866,461 B2
(45) Date of Patent: Dec. 15, 2020

(54) IMAGE DISPLAY DEVICE

(71) Applicant: SHARP KABUSHIKI KAISHA, Sakai (JP)

(72) Inventors: Jin Nakamura, Sakai (JP); Kohhei Katsuya, Sakai (JP); Taimi Oketani, Sakai (JP); Yoshihito Ishizue, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/816,083

(22) Filed: Mar. 11, 2020

(65) Prior Publication Data

US 2020/0292882 A1 Sep. 17, 2020

(30) Foreign Application Priority Data

Mar. 14, 2019 (JP) ................. 2019-047200

(51) Int. Cl.
*G02F 1/1333* (2006.01)
*G02F 1/1335* (2006.01)
*G02F 1/13357* (2006.01)
*G02F 1/1362* (2006.01)

(52) U.S. Cl.
CPC .... *G02F 1/133606* (2013.01); *G02F 1/13338* (2013.01); *G02F 1/133608* (2013.01); *G02F 1/136286* (2013.01); *G02F 1/133526* (2013.01); *G02F 2001/133314* (2013.01); *G02F 2001/133607* (2013.01)

(58) Field of Classification Search
CPC ......... G02F 1/133606; G02F 1/133308; G02F 1/133512; G02F 1/133528; G02F 1/13338; G02F 1/133608; G02F 1/133514; G02F 1/1333; G02F 1/1335; G02F 1/1336; G02F 1/133602; G02F 1/133615; G02F 1/133526; G02F 1/1362; G02F 1/136209; G02F 1/136286; G02F 1/133524; G02F 2001/133607; G02F 2001/133314; G02F 2202/28
See application file for complete search history.

(56) References Cited

U.S. PATENT DOCUMENTS

| 2008/0117497 A1 | 5/2008 | Shimodaira |
| 2008/0225216 A1 | 9/2008 | Shimodaira |
| 2020/0186688 A1* | 6/2020 | Chen ............... G02F 1/133512 |

FOREIGN PATENT DOCUMENTS

| JP | 2008-101352 A | 5/2008 |
| JP | 2008-257191 A | 10/2008 |

* cited by examiner

*Primary Examiner* — Thoi V Duong
(74) *Attorney, Agent, or Firm* — ScienBiziP, P.C.

(57) ABSTRACT

In an image display device including an image taking window portion, the image taking window portion for an image taking camera is disposed within the image display region, and an outer diameter of a frame portion is set to satisfy a specific condition based on an angle of view of the image taking camera.

12 Claims, 12 Drawing Sheets

IMAGE DISPLAY DEVICE

CROSS-REFERENCE TO RELATED APPLICATIONS

This application claims the benefit of priority to Japanese Patent Application Number 2019-047200 filed on Mar. 14, 2019. The entire contents of the above-identified application are hereby incorporated by reference.

BACKGROUND

Technical Field

The disclosure relates to an image display device.

Image display devices such as liquid crystal display devices are used in various fields such as cellular phones or in-vehicle display devices. Known such image display devices include an image taking camera for image taking disposed to face a display area (also referred to as a "screen display region"). These image display devices include an image taking window portion in a non-display area surrounding the display area, and the image taking camera is disposed at a position corresponding to the image taking window portion (see, for example, JP 2008-101352 A and JP 2008-257191 A).

SUMMARY

However, the conventional technology as described above has a problem in that the image taking camera provided in the image taking widow portion increases the width of the non-display area, leading to a corresponding reduction in display area.

An object of an aspect of the disclosure is to realize an image display device including an image taking camera, the image display device being capable suppressing a reduction in display area due to an image taking window portion.

To accomplish the above-described object, an image display device according to an aspect of the disclosure includes: an image forming layer configured to form an image in an image display region; and an image taking camera including an image taking lens, the image forming layer including a backlight including a through-hole, an image taking window portion formed on a light path of the image taking camera in the image forming layer at a position overlapping the image taking lens when seen in plan view, and a frame portion defining a peripheral edge of the image taking window portion, wherein the image taking camera is disposed on a back face side of the image forming layer and facing a display surface side of the image forming layer, at a position within the image display region when the image forming layer seen in plan view, with the image taking lens positioned inside the through-hole, and assume that a focal length of the image taking camera is d, a distance from a back face of the backlight to a tip of the image taking lens is G, an angle of view of the image taking camera is θ, a thickness of the backlight is D1, and a length of a frame of the backlight is $B_{BL}$, an outer diameter $\varphi_{STH}$ of the frame portion satisfying a following condition.

$$\varphi_{STH} \geq 2*(d+G+D1)\tan(\theta/2)+2*B_{BL}$$

To accomplish the above-described object, an image display device according to an aspect of the disclosure includes an image forming layer configured to form an image in an image display region; and an image taking camera including an image taking lens, the image forming layer including a backlight including a through-hole, a first polarizer, a thin film transistor substrate, an image taking window portion formed on a light path of the image taking camera in the image forming layer at a position overlapping the image taking lens when seen in plan view, and a frame portion defining a peripheral edge of the image taking window portion, wherein the image taking camera is disposed on a back face side of the image forming layer and facing a display surface side of the image forming layer, at a position within the image display region in a case where the image forming layer is seen in plan view, with the image taking lens positioned inside the through-hole, and assume that a focal length of the image taking camera is d, a distance from a back face of the backlight to a tip of the image taking lens is G, an angle of view of the image taking camera θ, a thickness of the backlight is D1, a thickness of the first polarizer is D2, a thickness of the thin film transistor substrate is D3, and a length of a frame of the thin film transistor substrate is BPANEL, an outer diameter $\varphi_{STH}$ of the frame portion satisfies a following condition.

$$\varphi_{STH} \geq 2*(d+G+D1+D2+D3)\tan(\theta/2)+2*B_{PANEL}$$

According an aspect of the disclosure, an image display device including an image taking camera fob image taking can be realized, the image display device being capable of suppressing a reduction in display area due to the image taking window portion.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
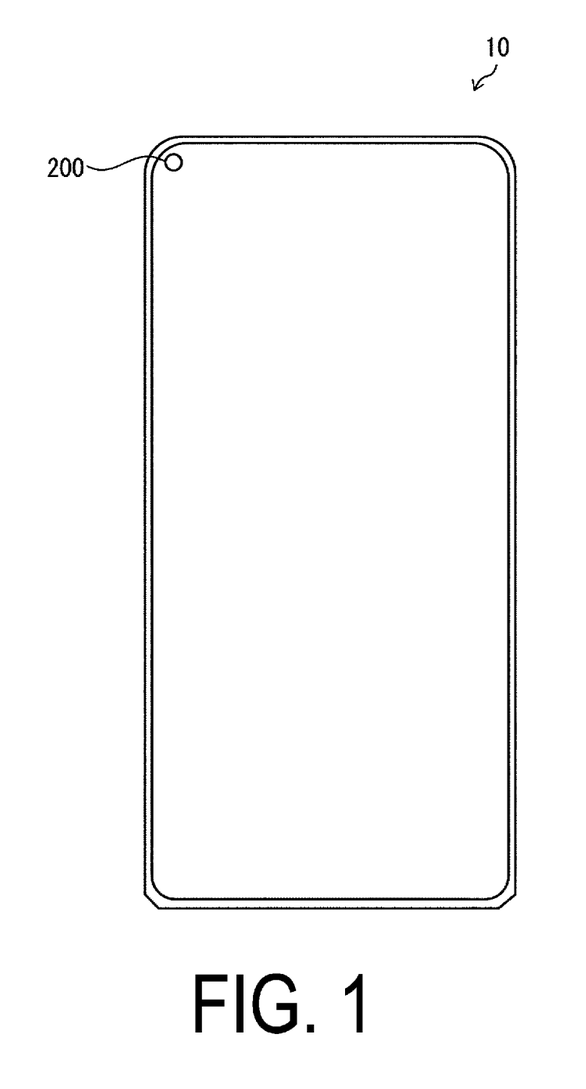
FIG. 1 is a diagram schematically illustrating a configuration of an image display device according to a first embodiment of the disclosure.
Figure 2:
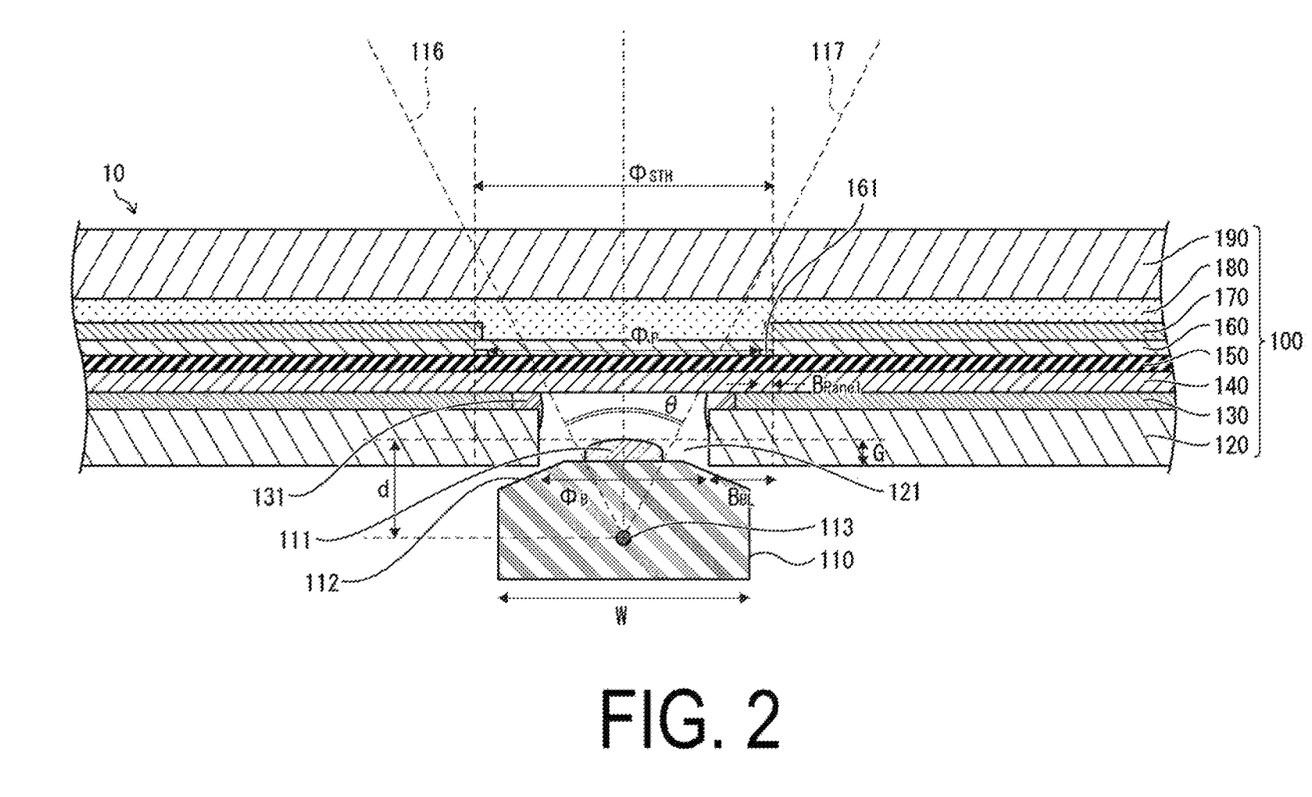
FIG. 2 is a diagram schematically illustrating a cross-sectional configuration of the image display device according to the first embodiment of the disclosure.

Hereinafter, an embodiment of the disclosure will be described in detail. FIG. 1 is a diagram schematically illustrating a configuration of an image display device according to a first embodiment of the disclosure. FIG. 2 is a diagram schematically illustrating a cross-sectional configuration of the image display device according to the first embodiment of the disclosure.

As illustrated in FIG. 1 and FIG. 2, the image display device 10 includes a liquid crystal display panel 100 and an image taking camera 110.

The liquid crystal display panel 100 includes a backlight 120, a first polarizer 130, a light blocking material 131, a thin film transistor (TFT) substrate 140, a liquid crystal layer 150, a color filter substrate 160, a second polarizer 170, an adhesive layer 180, a cover glass 190, and an image taking window portion 200. The liquid crystal display panel 100 corresponds to an image forming layer for forming an image in the image display region.

The backlight 120 is a light source of the liquid crystal display panel 100. The shape (planar shape) of the backlight 120 when seen in plan view is rectangular, and the backlight 120 includes a through-hole 121. The through-hole 121 is a hole for accommodating at least an image taking lens 111 of the image taking camera 110, and is disposed inside the image display region of the liquid crystal display panel 100 when seen in plan view. Note that the image display region is a display area surrounded by a non-display area such as a frame defining a peripheral edge of the image display device 10. An intended image based on a liquid crystal is displayed in the image display region. The planar shape of the through-hole 121 is, for example, a circle and is the same as the planar shape of the image taking lens 111 of the image taking camera 110.

The first polarizer 130 can be appropriately selected from polarizers known to be usable in image display devices.

The light blocking material 131 is a member for preventing light from the backlight 120 from leaking to the image taking lens 111 through reflection by the first polarizer 130. The light blocking material 131 is not particularly limited as long as the light blocking material 131 can block the light from the backlight 120, but the light blocking material 131 is preferably, for example, a black resin.

The TFT substrate 140 has the same configuration as that of TFT substrates known to be usable in image display devices. For example, the TFT substrate 140 may include a glass substrate, a scanning signal line, a light transmitting inorganic insulating film, a semiconductor film (for example, amorphous silicon, low-temperature polysilicon, or an oxide semiconductor), a data signal line and a drain electrode, a light transmitting organic insulating film, a light transmitting sensor signal line, a light transmitting inorganic insulating film, a light transmitting pixel electrode, a light transmitting inorganic insulating film, and a light transmitting common electrode that are arranged in this order in an upward direction (emission direction of display light), and the TFT substrate 140 may be provided with a transistor including a semiconductor film as a channel. The pixel electrode, the common electrode, and the sensor signal line may be formed from a light transmitting metal compound such as ITO or IZO.

The liquid crystal layer 150 may be appropriately selected from liquid crystal layers known to be usable in image display devices.

Like the TFT substrate 140, the color filter substrate 160 has the same configuration as that of color filter substrates known to be usable in image display devices. For example, the color filter substrate includes a primary color (red, green, and blue) color filter, a colorless coat (transparent coat), and a black matrix. The colorless coat desirably has a light transmittance of 90% or greater, and may be a color material for white subpixels.

Like the first polarizer 130, the second polarizer 170 can be appropriately selected from polarizers known to be usable in image display devices. The orientations of polarization in the first polarizer 130 and the second polarizer 170 are appropriately determined depending on the liquid crystal structure of the liquid crystal display panel.

The adhesive layer (OCR) 180 is an adhesive layer having transparency and bonds the second polarizer 170 and the cover glass 190 together.

The image taking window portion 200 is a portion facing the through-hole 121 in the liquid crystal display panel 100. The image taking window portion 200 is formed on a light path of the image taking camera 110. The image taking window portion 200 is a light path image taking by the image taking camera 110, and has sufficient transparency for image taking by the image taking camera 110. The light transmittance of the image taking window portion 200 is, for example, 85% or greater. Parts of the first polarizer 130 and the second polarizer 170 corresponding to the image taking window portion 200 form through-holes.

A part of the TFT substrate 140 corresponding to the image taking window portion 200 is a region including a transparent substrate and from which wiring lines in the TFT substrate 140 are removed. As illustrated in FIG. 2 in further detail, the above-described part of the TFT substrate 140 includes the image taking window portion 200 having a circular planar shape and an annular frame portion defining a peripheral edge of the image taking window portion 200. The frame portion includes wiring lines disposed on the TFT substrate 140 and bypassing the image taking window portion 200 and a black matrix 161 overlapping with the wiring lines when seen in plan view.

As illustrated in FIG. 2, the image taking camera 110 includes the image taking lens 111 and a notch portion 112. The image taking camera 110 is disposed to position the image taking lens 111 inside the through-hole 121. In this way, the image taking camera 110 is disposed on a back face side of the liquid crystal display panel 100 and facing a display surface side of the liquid crystal display panel 100 at a position within the image display region when the liquid crystal display panel 100 is seen in plan view. The image taking camera 110 is, for example, an imaging element such as a CCD image sensor or CMOS image sensor.

Since the image taking camera 110 includes the notch portion 112, the inner diameter of the through-hole 121 may be smaller than a length W of the image taking camera 110.

In the image display device 10, in a case where the size of a frame of the backlight 120 is greater than or equal to the size of a panel frame, an outer diameter $\varphi_{STH}$ of the frame portion satisfies the following condition.

$$\varphi_{STH} \geq 2*(d+G+D1)\tan(\theta/2)+2*B_{BL}$$

Here, assume that the focal length of the image taking camera 110 is d, the distance from a back face of the backlight 120 to a tip of the image taking lens 111 is G, the angle of view of the image taking camera 110 is θ, the thickness of the backlight 120 is D1, and the length of the frame of the backlight 120 is $B_{BL}$.

An outer diameter $\varphi_{STH}$ of the frame portion is, in other words, the diameter of the non-display area. The focal length d is a distance from the camera focus 113 to the tip of the image taking lens 111. As illustrated in FIG. 2, the angle of view θ is an angle formed on the image taking lens 111 side of an intersection point between straight lines 116 and 117. The position of the camera focus 113 and the angle of view θ can be appropriately adjusted by increasing or reducing the focal length d or a detection region of a sensor of the image taking camera 110. As illustrated in FIG. 2, the length $B_{BL}$ of the frame of the backlight 120 is a length in a length direction from a display surface-side edge of the through-hole 121 to an extended surface of a surface of the black matrix 161 opposite to the image taking window portion 200.

Note that the outer diameter $\varphi_{STH}$ the frame portion is expressed by the following equation.

$$\varphi_{STH} = \varphi_B + 2*B_{BL}$$

Here, the display surface-side diameter of the through-hole 121 is assumed to be $\varphi_B$.

In the image display device 10, in a case where the size of the panel frame is greater than or equal to the size of the frame of the backlight 120, the outer diameter $\varphi_{STH}$ of the frame portion satisfies the following condition.

$$\varphi_{STH} \geq 2*(d+G+D1+D2+D3)\tan(\theta/2)+2*B_{PANEL}$$

Here, assume that the focal length of the image taking camera 110 is d, the distance from the back face of the backlight 120 to the tip of the image taking lens 111 is G, the angle of view of the image taking camera 110 is G, the thickness of the backlight 120 is D1, the thickness of the first polarizer 130 is D2, the thickness of the TFT substrate 140 is D3, and the length of a frame of the TFT substrate 140 is $B_{PANEL}$. The length $B_{PANEL}$ of the frame of the TFT substrate 140 is the same as the length of the black matrix 161, as illustrated in FIG. 2.

Note that the outer diameter $\varphi_{STH}$ the frame portion is expressed by the following equation.

$$\varphi_{STH} = \varphi_P + 2*B_{PANEL}$$

Here, the diameter of the image taking window portion 200 is assumed to be $\varphi_P$.

In the image display device 10, the outer diameter $\varphi_{STH}$ of the frame portion may have a magnitude allowing the image taking window portion 200 to function as an image taking window portion and corresponding to the number of wiring lines bypassing the image taking window portion 200. An upper limit of the outer diameter $\varphi_{STH}$ of the frame portion can be appropriately determined in terms of "for use in image taking." In terms of such an application, the upper limit can be determined to be a value enabling sufficient suppression of a reduction in display area due to the image taking window portion 200 and the frame portion.

Modified Example of First Embodiment

Figure 3:
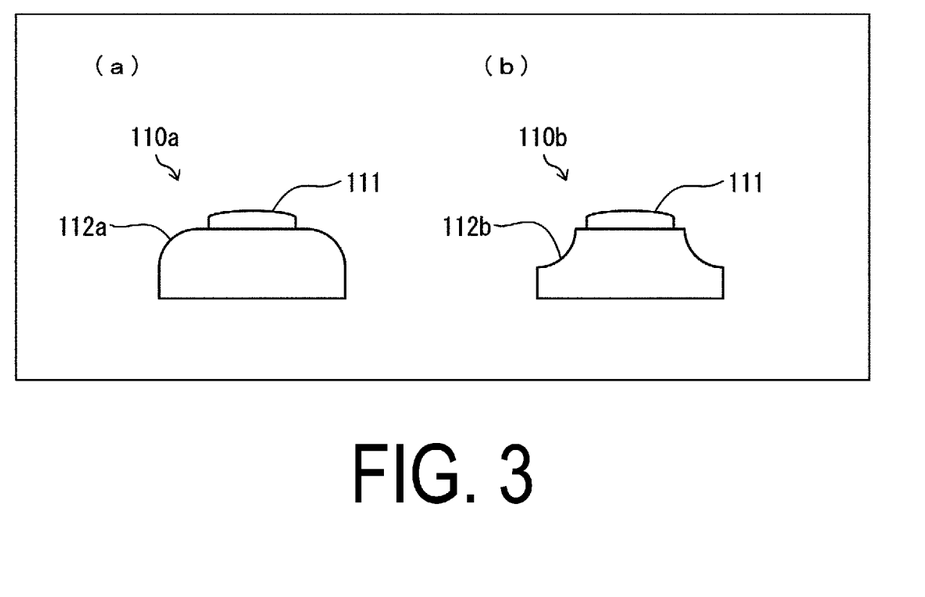
FIG. 3 is a diagram schematically illustrating a configuration of a modified example of an image taking camera provided in the image display device according to the first embodiment of the disclosure.

FIG. 3 is a diagram schematically illustrating a configuration of a modified example of the image taking camera included in the image display device according to the first embodiment of the disclosure.

The image display device 10 may include an image taking camera 110a including an R-shaped notch portion 112a illustrated in (a) of FIG. 3 instead of the image taking camera 110 having the notch portion 112. Alternatively, the image display device 10 may include the image taking camera 110b including an inverted-R-shaped cutting portion 112b illustrated in (h) of FIG. 3 instead of the image taking camera 110 including the notch portion 112. The notch portions 112, 112a, and 112b are not limited to the above-described shapes, and may have any shapes as long as the shapes allow the image taking cameras 110, 110a, and 110b to be disposed closer to the cover glass 190 while reducing the inner diameter of the through-hole 121. Reducing the inner diameter of the through-hole 121 can widen the image display region. By disposing the image taking cameras 110, 110a, and 110b closer to the cover glass 190, the thickness of the image display device 10 can be reduced.

Second Embodiment

Figure 4:
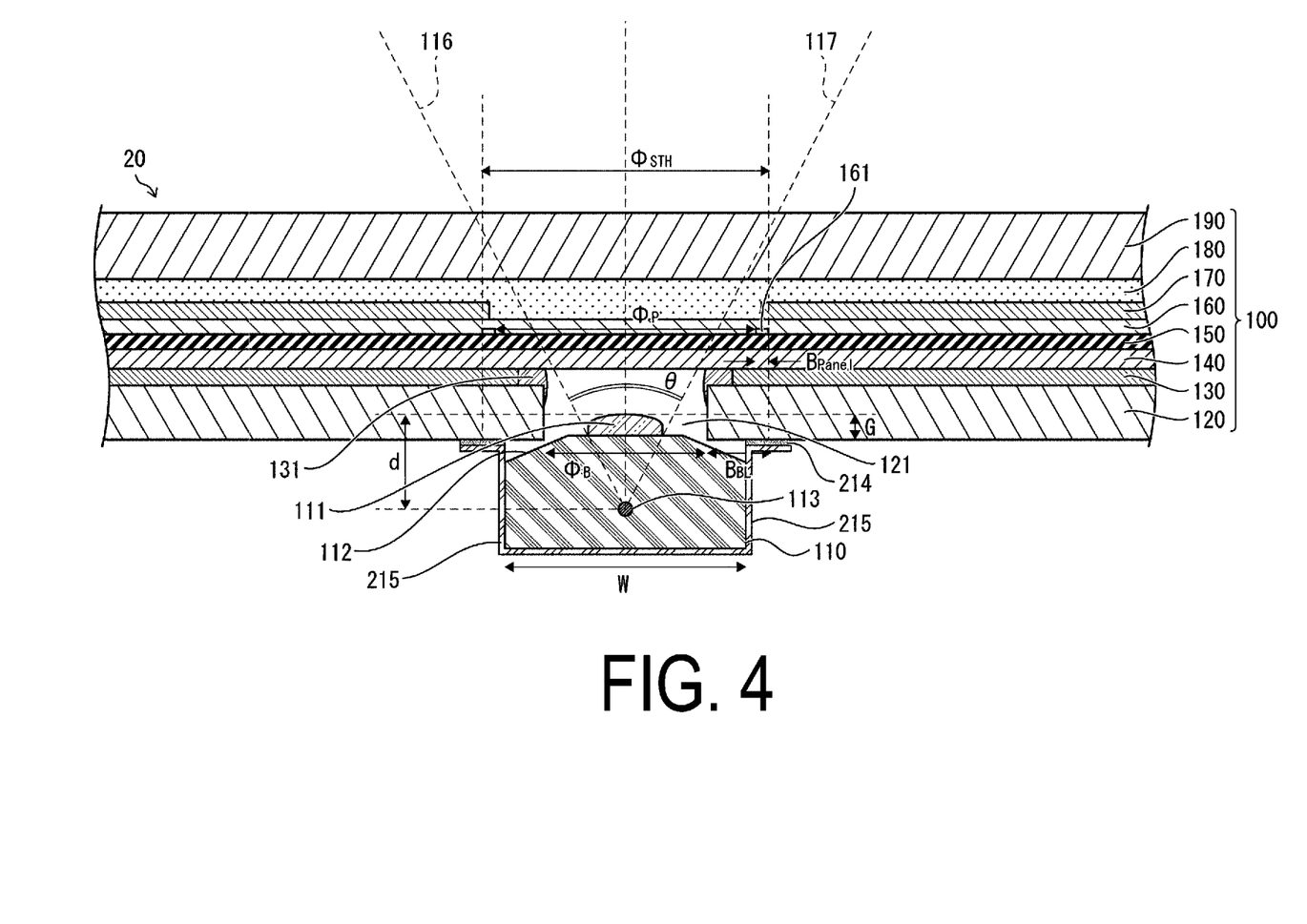
FIG. 4 is a diagram schematically illustrating a cross-sectional configuration of an image display device according to a second embodiment of the disclosure.

Another embodiment of the disclosure is described below. FIG. 4 is a diagram schematically illustrating a cross-sectional configuration of an image display device according to a second embodiment of the disclosure. Note that for the sake of convenience of description, members having the same functions as those of the members described in the foregoing embodiment are assigned the same reference signs, and the description of members is omitted.

The image display device 20 includes a support material 215 and an adhesive sheet 214. Otherwise the image display device 20 is configured similarly to the image display device 10. The support material 215 and the adhesive sheet 214 correspond to fixing members for fixing the image taking camera 110 to the liquid crystal display panel 100.

The support material 215 is a member for covering a surface of the image taking camera 110 opposite to the image taking lens 111 and a side surface of the image taking lens 111.

The adhesive sheet 214 is a member for fixing the support material 215 to the back face of the backlight 120. The adhesive sheet 214 is not particularly limited as long as the adhesive sheet 214 can fix the support material 215 to the back face of the backlight 120. The support material 215 and the adhesive sheet 214 provided in the image display device 20 allow the image taking camera 110 to be fixed at an optimal position to suppress misalignment of the image taking camera 110.

Third Embodiment

Figure 5:
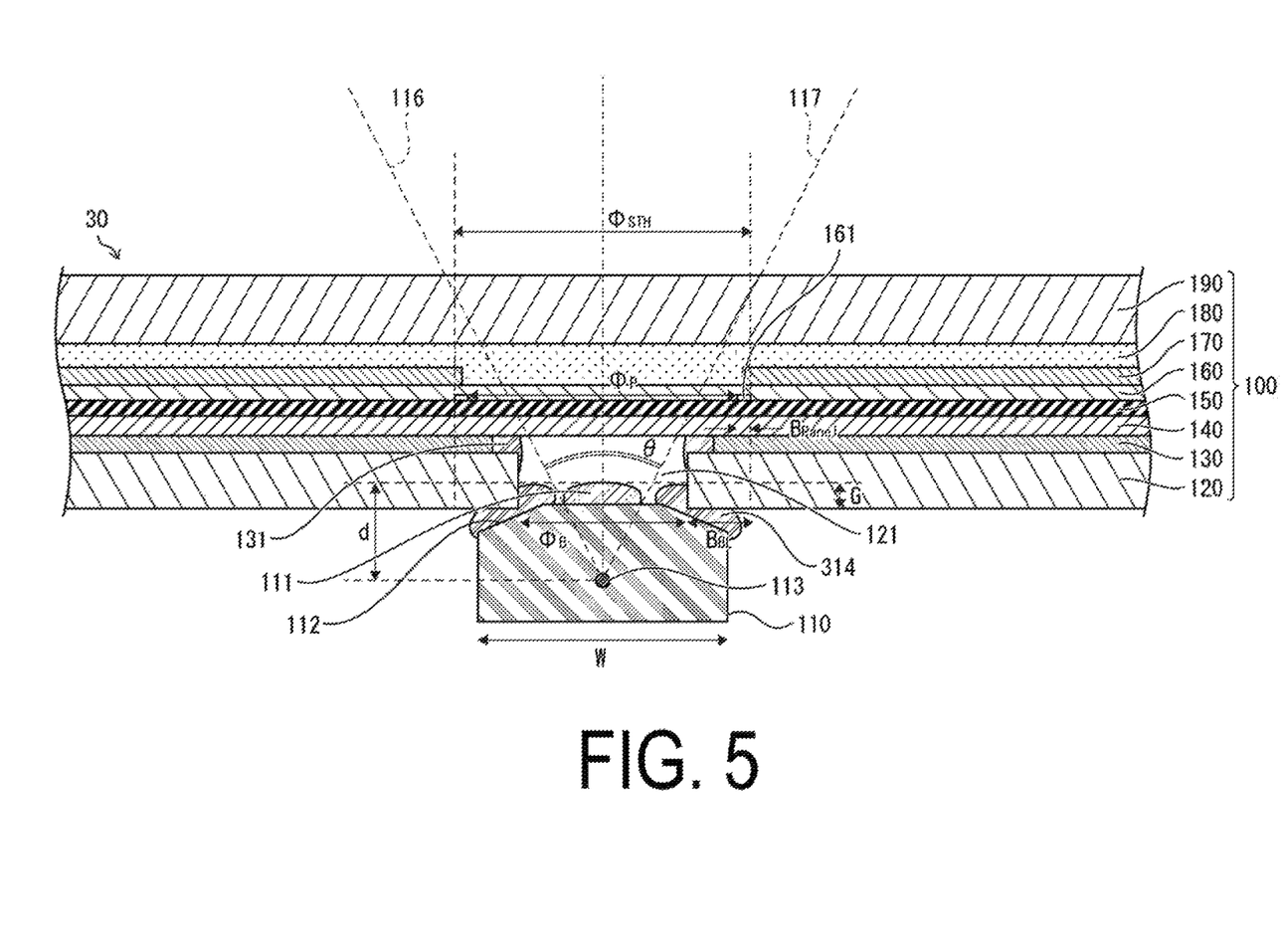
FIG. 5 is a diagram schematically illustrating a cross-sectional configuration of an image display device according to a third embodiment of the disclosure.

Another embodiment of the present disclosure will be described below. FIG. 5 is a diagram schematically illustrating a cross-sectional configuration of an image display device according to a third embodiment of the disclosure. Note that for the sake of convenience of description, members having the same functions as those of the members described in the foregoing embodiment are assigned the same reference signs, and the description of members is omitted.

An image display device 30 includes a fixing resin 314. Otherwise the image display device 30 is configured similarly to the image display device 10. The fixing resin 314 corresponds to a fixing member for fixing the image taking camera 110 to the liquid crystal display panel 100.

The fixing resin 314 is a member for fixing the image taking camera 110 to the backlight 120. The fixing resin 314 is not particularly limited as long as the fixing resin 314 can fix the image taking camera 110 to the backlight 120. The fixing resin 314 provided in the image display device 30 allows the image taking camera 110 to be fixed at an optimal position to suppress misalignment of the image taking camera 110.

Fourth Embodiment

Figure 6:
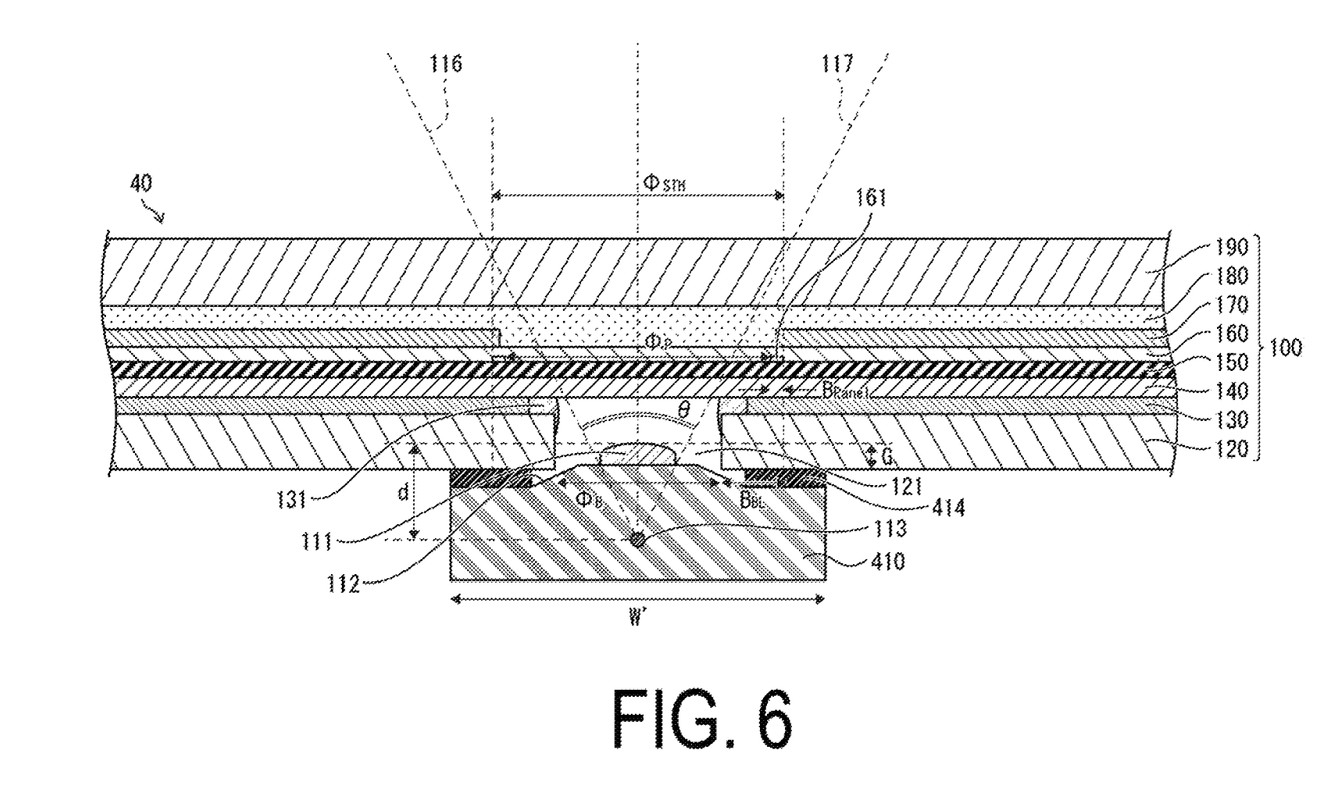
FIG. 6 is a diagram schematically illustrating a cross-sectional configuration of an image display device according to a fourth embodiment of the disclosure.

Another embodiment of the present disclosure will be described below. FIG. 6 is a diagram schematically illustrating a cross-sectional configuration of an image display device according to a fourth embodiment of the disclosure. Note that for the sake of convenience of description, members having the same functions as those of the members described in the foregoing embodiment are assigned the same reference signs, and the description of members is omitted.

The image display device 40 includes an image taking camera 410 instead of the image taking camera 110, and includes an adhesive tape 414. Otherwise the image display device 40 is configured similarly to the image display device 10. The adhesive tape 414 corresponds to a fixing member for fixing the image taking camera 410 to the liquid crystal display panel 100.

The length of the image taking camera 410 when seen in plan view is W'. The length W' of the image taking camera 410 when seen in plan view is larger than the length W of the image taking camera 110 when seen in plan view. A surface of the image taking camera 410 adhering to the adhesive tape 414 is parallel to the back face of the backlight 120.

The adhesive tape 414 is a member for fixing the image taking camera 410 to the backlight 120. The adhesive tape 414 is not particularly limited as long as the adhesive tape 414 can fix the image taking camera 410 to the backlight 120. The adhesive tape 414 provided in the image display device 30 allows the image taking camera 410 to be fixed at an optimal position to suppress misalignment of the image taking camera 410.

Fifth Embodiment

Figure 7:
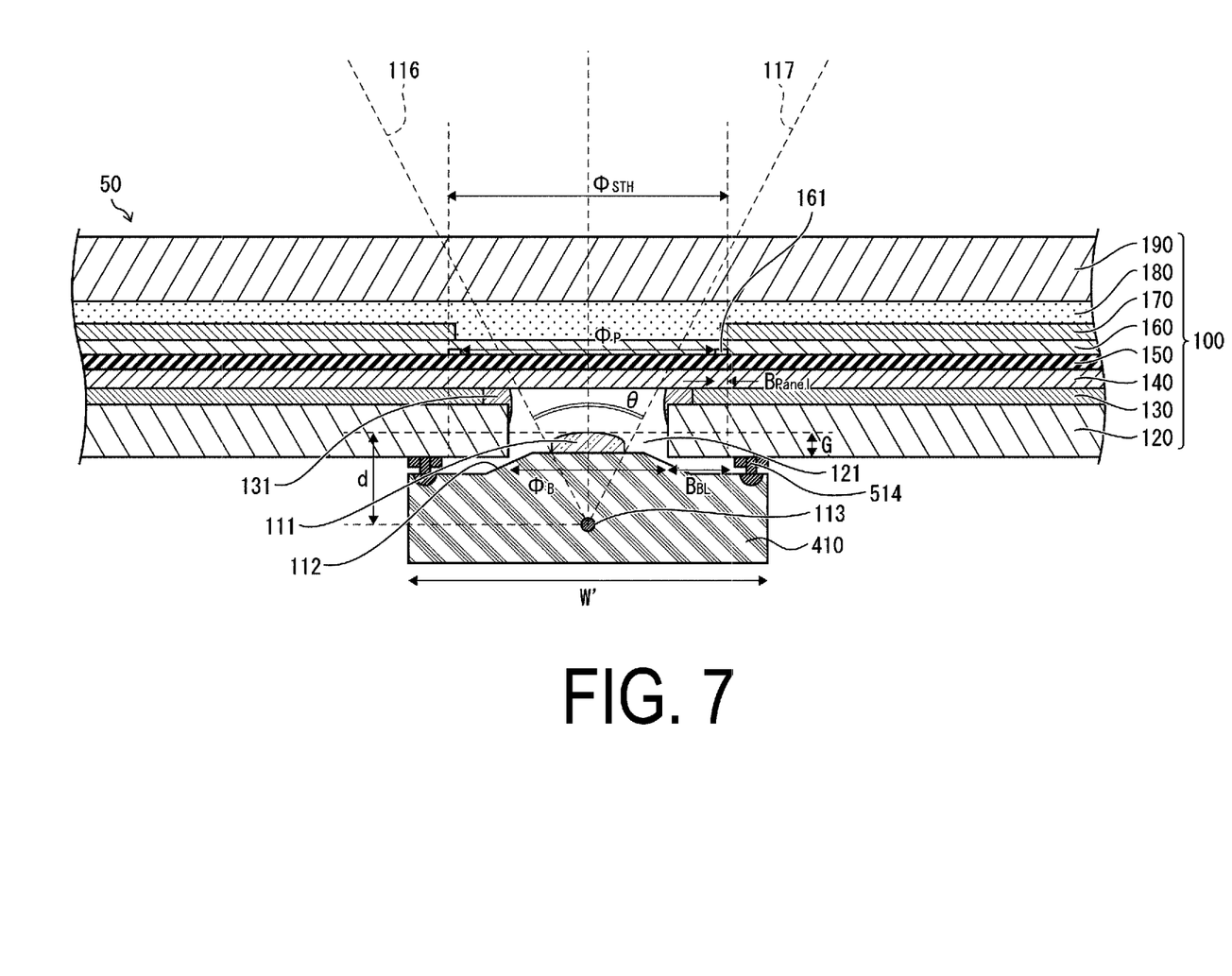
FIG. 7 is a diagram schematically illustrating a cross-sectional configuration of an image display device according to a fifth embodiment of the disclosure.

Another embodiment of the present disclosure will be described below. FIG. 7 is a diagram schematically illustrating a cross-sectional configuration of an image display device according to a fifth embodiment of the disclosure. Note that for the sake of convenience of description, members having the same functions as those of the members described in the foregoing embodiment are assigned the same reference signs, and the description of members is omitted.

An image display device 50 includes screws 514. Otherwise the image display device 50 is configured similarly to the image display device 40. The screws 514 correspond to a fixing member for fixing the image taking camera 410 to the liquid crystal display panel 100.

The screws 514 correspond to a member for fixing the image taking camera 410 to the backlight 120. The number and material of the screws 514 is not particularly limited as long as the screws 514 can fix the image taking camera 410 to the backlight 120. The screws 514 provided in the image display device 50 allow the image taking camera 410 to be fixed at an optimal position to suppress misalignment of the image taking camera 410.

Sixth Embodiment

Figure 8:
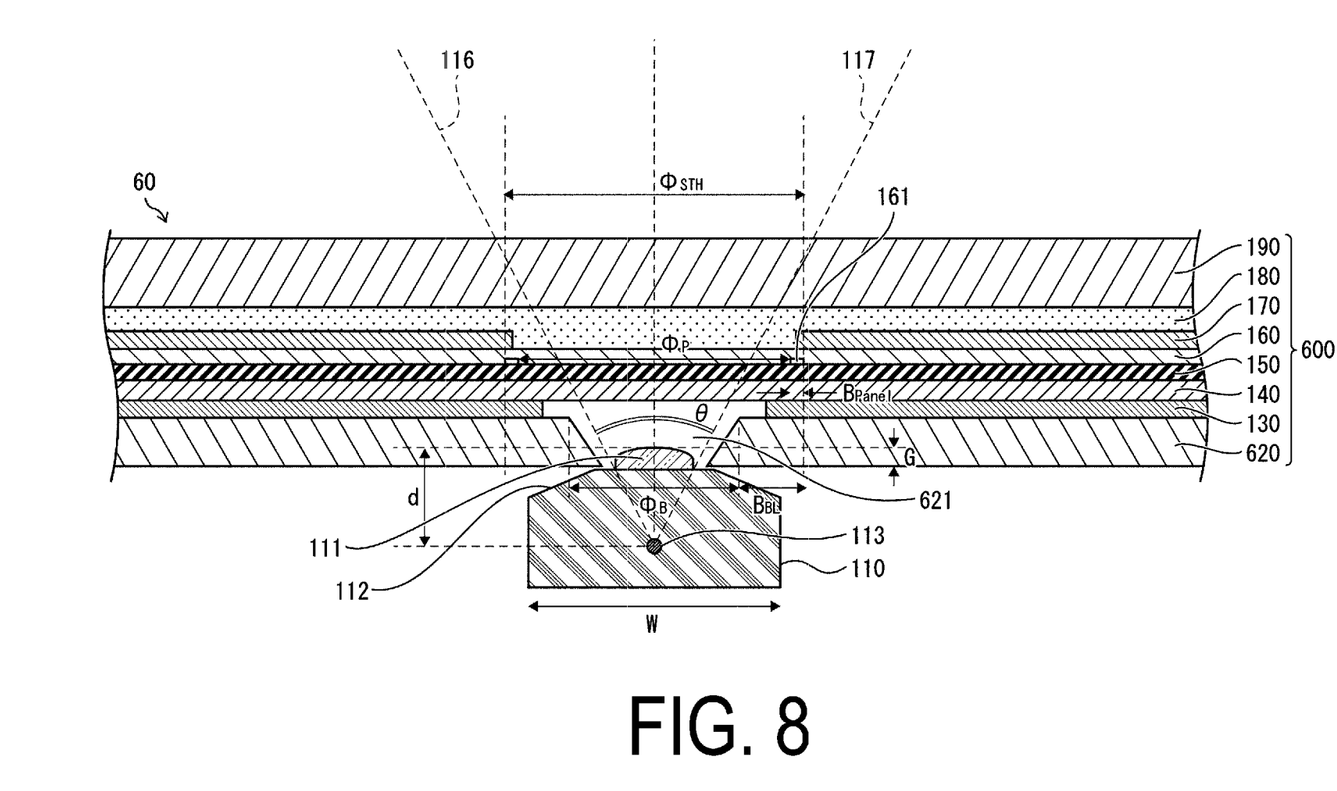
FIG. 8 is a diagram schematically illustrating a cross-sectional configuration of an image display device according to a sixth embodiment of the disclosure.

Another embodiment of the present disclosure will be described below. FIG. 8 is a diagram schematically illustrating a cross-sectional configuration of an image display device according to a sixth embodiment of the disclosure. Note that for the sake of convenience of description, members having the same functions as those of the members described in the foregoing embodiment are assigned the same reference signs, and the description of members is omitted.

An image display device 60 includes a liquid crystal display panel 600 instead of the liquid crystal display panel 100, and does not include the light blocking material 131. Otherwise the image display device 60 is configured similarly to the image display device 10.

The liquid crystal display panel 600 includes a backlight 620 instead of the backlight 120. Otherwise the liquid crystal display panel 600 is configured similarly to the liquid crystal display panel 100. The backlight 620 includes a through-hole 621. The cross-sectional shape of the through-hole 621 side of the backlight 620 in a thickness direction is a C cut shape inclined from the display surface side toward the back face side. The back face side of the through-hole 621 has a smaller diameter than the display surface side of the through-hole 621.

Figure 9:
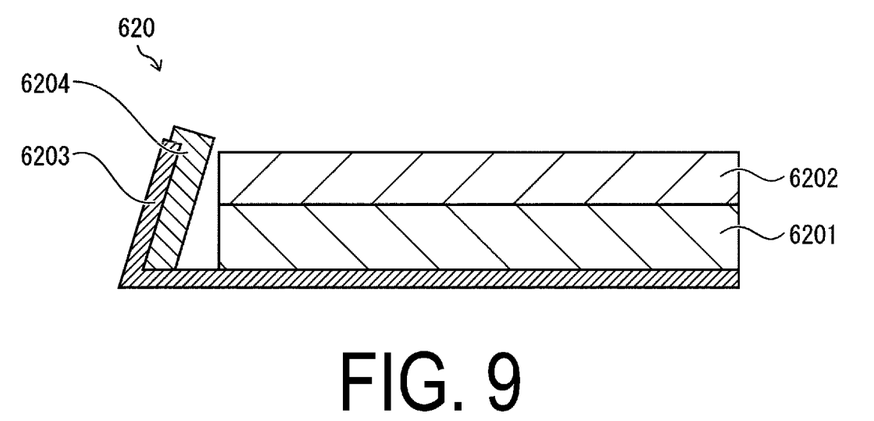
FIG. 9 is a diagram schematically illustrating a configuration of a cross section of a backlight included in the image display device according to a sixth embodiment of the disclosure.

FIG. 9 is a diagram schematically illustrating a cross-sectional configuration of the backlight 620. The backlight 620 includes a light guide plate 6201, a sheet 6202, a frame body 6203, and a resin frame 6204.

The light guide plate 6201 includes a reflection sheet and a member for conducting light. The sheet 6202 is disposed on the light guide plate 6201. Examples of the sheet 6202 include a diffuser sheet, a lens sheet, and the like. The backlight 120 may include a plurality of sheets 6202.

The frame body 6203 is a member for storing the light guide plate 6201, the sheet 6202, and the resin frame 6204. The frame body 6203 is, for example, a sheet metal such as stainless steel (SUS). The resin frame 6204 serves as a structure used to secure a bonding area for the adhesive tape used for bonding the first polarizer 130 or the TFT substrate 140 and the backlight 620 together. However, in a case where, instead of the adhesive tape, a black resin used as the light blocking material 131 is used for bonding, the resin frame 6204 is not necessarily required.

A surface of the backlight 620 surrounding the through-hole 621 has a C cut shape inclined from the display surface side toward the back face side. Thus, a space larger than a space between the sheet 6202 and the resin frame 6204 can be provided between the light guide plate 6201 and the resin frame 6204, which has a larger width in thermal expansion and contraction than the sheet 6202. Such an inclination is advantageous to the angle of view θ of the image taking camera 110, and allows a foot portion of the spread of the angle of view θ to be effectively utilized while providing the display surface side of the through-hole 621 with a sufficient diameter.

Seventh Embodiment

Figure 10:
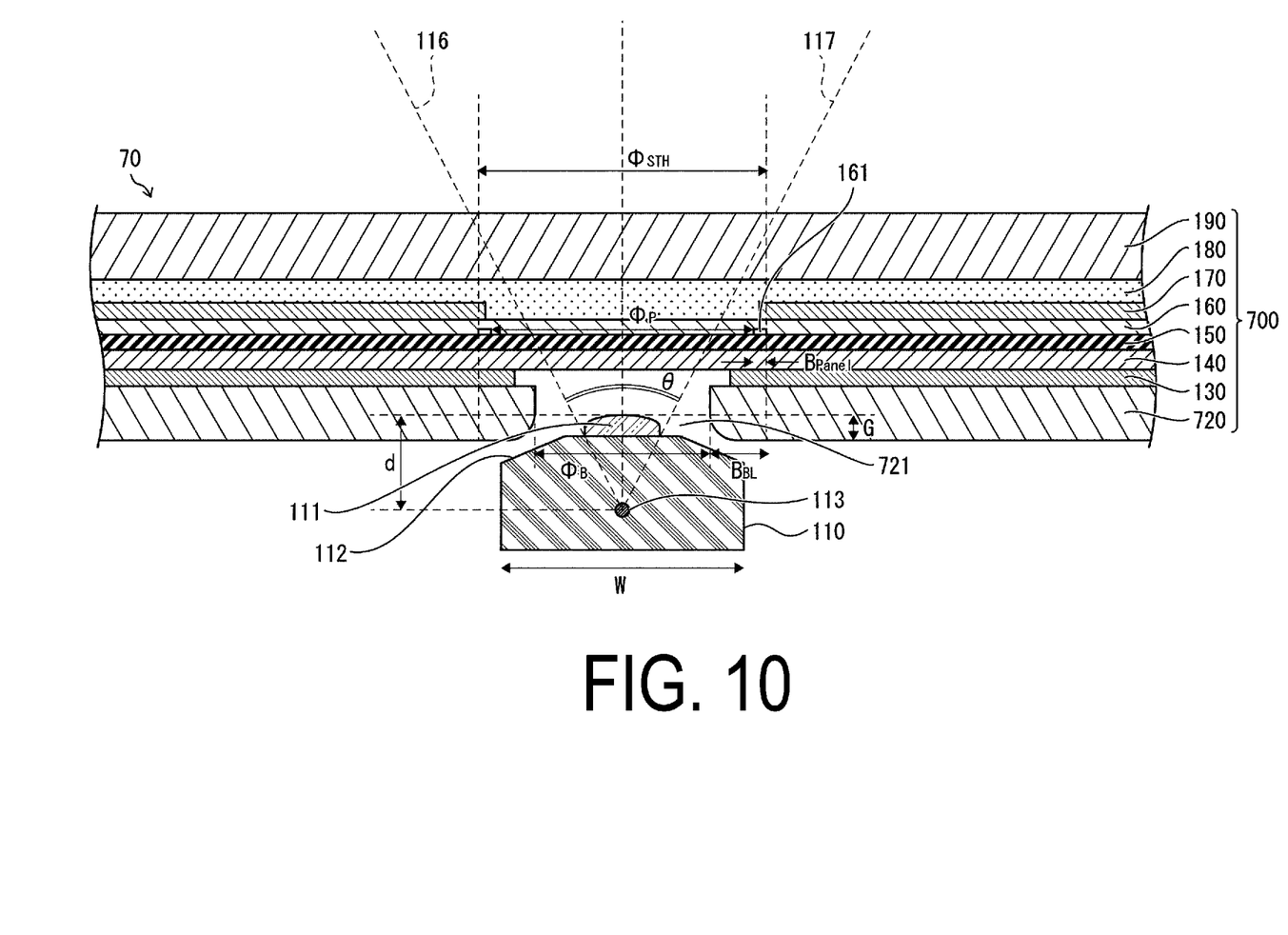
FIG. 10 a diagram schematically illustrating a cross-sectional configuration of an image display device according to a seventh embodiment of the disclosure.

Another embodiment of the present disclosure will be described below. FIG. 10 is a diagram schematically illustrating a cross-sectional configuration of an image display device according to a seventh embodiment of the disclosure. Note that for the sake of convenience of description, members having the same functions as those of the members described in the foregoing embodiment are assigned the same reference signs, and the description of members is omitted.

The image display device 70 includes a liquid crystal display panel 700 instead of the liquid crystal display panel 100, and does not include the light blocking material 131. Otherwise the image display device 70 is configured similarly to the image display device 10.

The liquid crystal display panel 700 includes a backlight 720 instead of the backlight 120. Otherwise the liquid crystal display panel 700 is configured similarly to the liquid crystal display panel 100. The backlight 720 includes a through-hole 721. A surface of the backlight 720 surrounding the through-hole 721 is a curved surface. A cross section of the backlight 720 on the through-hole 721 side in the thickness direction has a right angle shape on the display surface side and an R shape on the back face side. The back face side of the through-hole 721 has a larger diameter than the display surface side of the through-hole 721. The backlight 720 has a shape in which a back face-side corner of the backlight 720 is rounded off as described above, and thus the image taking camera 110 can be more easily embedded in the through-hole 721. Thus, the thickness of the image display device 70 can be reduced.

Modified Example of Seventh Embodiment

Figure 11:
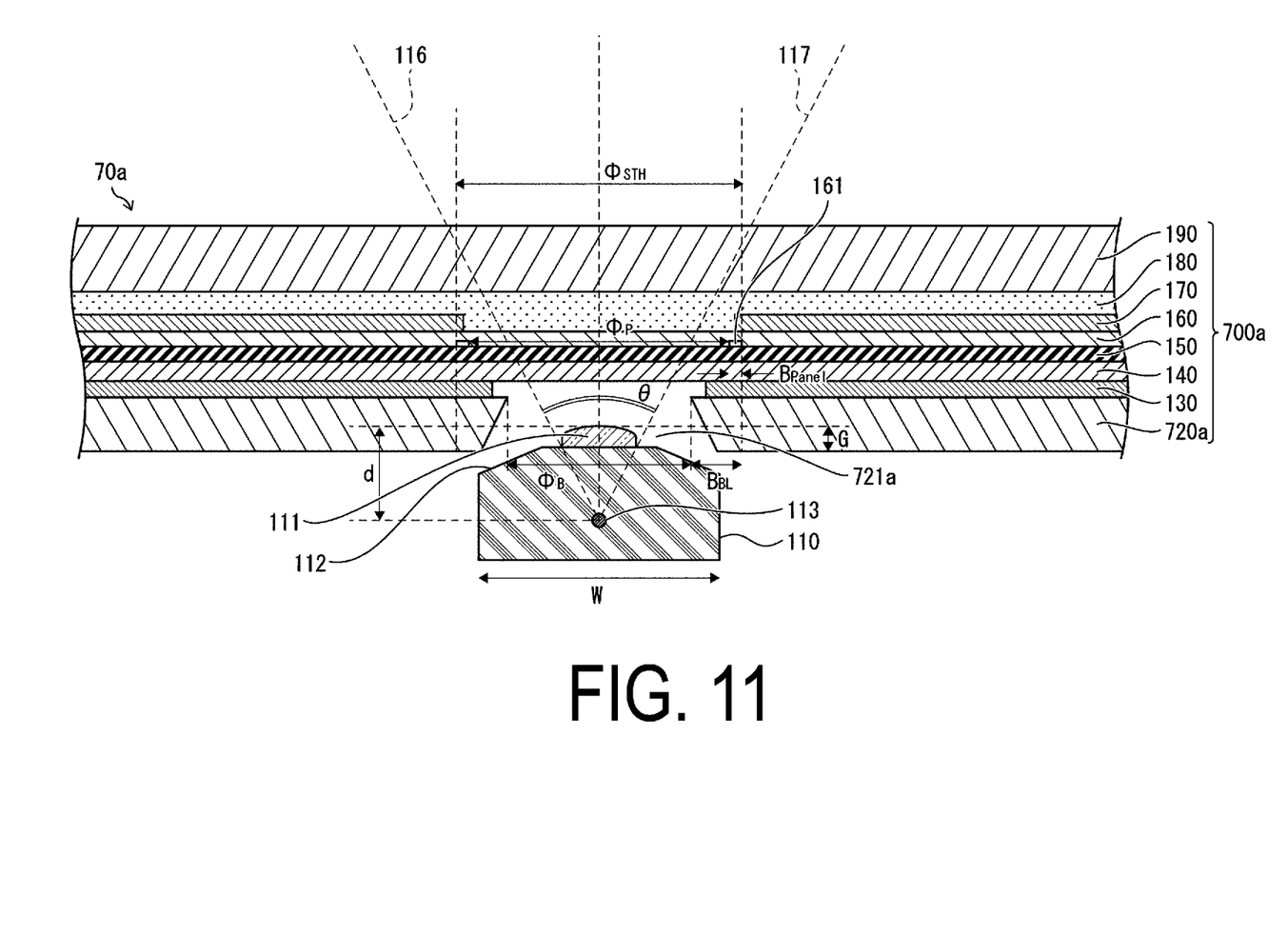
FIG. 11 is a diagram schematically illustrating a cross-sectional configuration of an image display device according to a modified example of the seventh embodiment of the disclosure.

FIG. 11 is a diagram schematically illustrating a cross-sectional configuration of an image display device according to a modified example of the seventh embodiment of the disclosure.

An image display device 70a includes a liquid crystal display panel 700a instead of the liquid crystal display panel 700. Otherwise the image display device 70a is configured similarly to the image display device 70.

The liquid crystal display panel 700a includes a backlight 720a instead of the backlight 720. Otherwise the liquid crystal display panel 700a is configured similarly to the liquid crystal display panel 700. The backlight 720a includes a through-hole 721a. A surface of the backlight 720a surrounding the through-hole 721a is an inclined surface. The cross-sectional shape of the through-hole 721a side of the backlight 720a in the thickness direction is inclined from the back face side toward the display surface side (C cut shape). The back face side of the through-hole 721a has a larger diameter than the display surface side of the through-hole 721a. Such a shape of the backlight 720a allows the image taking camera 110 to be more easily embedded in the through-hole 721a. Thus, the thickness of the image display device 70a can be reduced.

Eighth Embodiment

Figure 12:
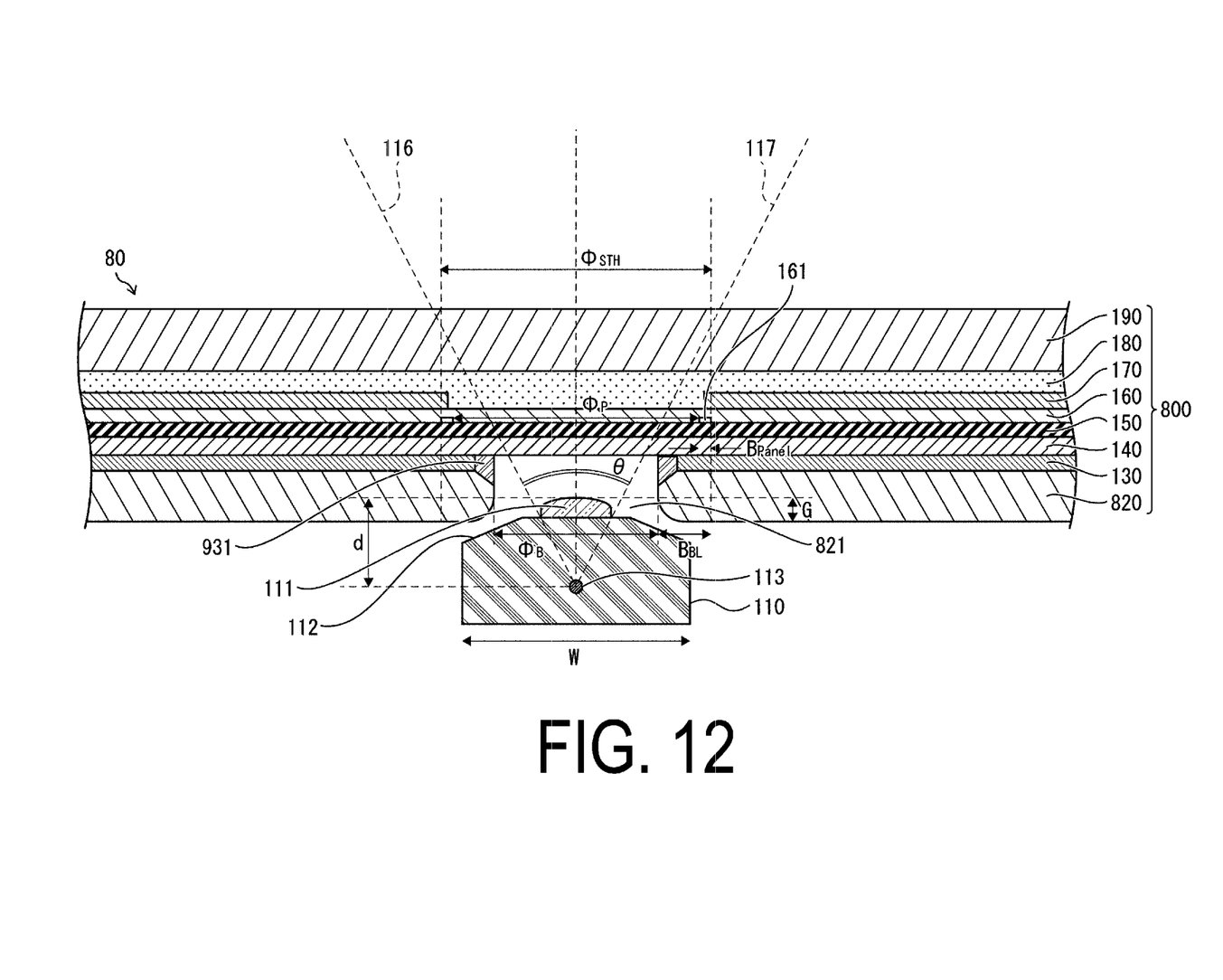
FIG. 12 is a diagram schematically illustrating a cross-sectional configuration of image display device according to an eighth embodiment of the disclosure.

Another embodiment of the present disclosure will be described below. FIG. 12 is a diagram schematically illustrating a cross-sectional configuration of an image display device according to an eighth embodiment of the disclosure. Note that for the sake of convenience of description, members having the same functions as those of the members described in the foregoing embodiment are assigned the same reference signs, and the description of members is omitted.

The image display device 80 includes a liquid crystal display panel 800 instead of the liquid crystal display panel 100, and includes a light blocking material 931 instead of the light blocking material 131. Otherwise the image display device 70 is configured similarly to the image display device 10.

The liquid crystal display panel 800 includes a backlight 820 instead of the backlight 120. Otherwise the liquid crystal display panel 800 is configured similarly to the liquid crystal display panel 100. The backlight 820 includes a through-hole 821. A surface of the backlight 820 surrounding the through-hole 821 includes an inclined surface and a curved surface. The cross-sectional shape of the through-hole 821 side of the backlight 820 in the thickness direction has, on the display surface side, a C cut shape inclined from the display surface side toward the back face side, and has, on the back face side, an R shape with a corner of the backlight 820 rounded off. The C cut shape of the display surface side, inclined from the display surface side toward the back face side, is advantageous to the angle of view θ of the image taking camera 110, allowing the display surface side of the through-hole 821 to be provided with a sufficient diameter, in a case where the light blocking material light blocking material 931 is not provided. The R shape of the back face side, in which the corner is rounded off, allows the image taking camera 110 to be more easily embedded in the through-hole 821. Thus, the thickness of the image display device 80 can be reduced.

The C cut shape inclined from the display surface side toward the back face side allows the light blocking material 931 to be disposed to avoid protruding beyond the surface of the backlight 820 surrounding the through-hole 821, toward the image taking lens 111 side. Thus, the display surface side of the through-hole 821 can be provided with a sufficient diameter.

Modified Example

Note that the image display devices according to the above-described embodiments may further have configurations in addition to those described above or may have other configurations replacing the above-described configurations, to the extent that the effects of the present embodiments described above are obtained.

For example, the image forming layer may be a common display panel combining together color elements including primary colors (red, green, and blue) and complementary color elements for the primary colors to express colors, and may be a liquid crystal display panel as described in the aforementioned embodiments, or may be an organic EL display panel.

Supplement

An image display device according to a first aspect of the disclosure includes: an image forming layer configured to form an image in an image display region; and an image taking camera including an image taking lens, the image forming layer including a backlight including a through-hole, an image taking window portion formed on a light path of the image taking camera in the image forming layer at a position overlapping the image taking lens when seen in plan view, and a frame portion defining a peripheral edge of the image taking window portion, wherein the image taking camera is disposed on a back face side of the image forming layer and facing a display surface side of the image forming layer, at a position within the image display region when the image forming layer is seen in plan view, with the image taking lens positioned inside the through-hole, and assume that a focal length of the image taking camera is d, a distance from a back face of the backlight to a tip of the image taking lens is G, an angle of view of the image taking camera is θ, a thickness of the backlight is D1, and a length of a frame of the backlight is BBL, an outer diameter φSTH of the frame portion satisfying a following condition.

$$\varphi_{STH} \geq 2*(d+G+D1)\tan(\theta/2)+2*B_{BL}$$

An image display device according to a second aspect of the disclosure includes an image forming layer configured to form an image in an image display region; and an image taking camera including an image taking lens, the image forming layer including a backlight including a through-hole, a first polarizer, a thin film transistor substrate, an image taking window portion formed on a light path of the image taking camera in the image forming layer at a position overlapping the image taking lens when seen in plan view, and a frame portion defining a peripheral edge of the image taking window portion, wherein the image taking camera is disposed on a back face side of the image forming layer and facing a display surface side of the image forming layer, at a position within the image display region in a case where the image forming layer is seen in plan view, with the image taking lens positioned inside the through-hole, and assume that a focal length of the image taking camera is d, a distance from a back face of the backlight to a tip of the image taking lens is G, an angle view of the image taking camera is θ, a thickness of the backlight is D1, a thickness of the first polarizer is D2, a thickness of the thin film transistor substrate is D3, and a length of a frame of the thin film transistor substrate is BPANEL, an outer diameter φSTH of the frame portion satisfies a following condition.

$$\varphi_{STH} \geq 2*(d+G+D1+D2+D3)\tan(\theta/2)+2*B_{PANEL}$$

According to a third aspect of the disclosure, in the image display device in the first or second aspect, the image taking camera may further include a notch portion.

According to a fourth aspect of the disclosure, the image display device in any one of the first to third aspects may further include a fixing member for fixing the image taking camera to the image forming layer.

According to a fifth aspect of the disclosure, in the image display device in any one of the first to fourth aspects, a surface of the backlight surrounding the through-hole may include at least one of an inclined surface and a curved surface.

According to a sixth aspect of the disclosure, the image display device in any one of the first to fifth aspects may further include a light blocking material.

According to a seventh aspect of the disclosure, in the image display device in any one of the first to sixth aspects, the image forming layer may be a liquid crystal display panel.

The disclosure is not limited to each of the embodiments described above, and various modifications may be made within the scope of the claims. Embodiments obtained by appropriately combining technical approaches disclosed in each of the different embodiments also fall within the technical scope of the disclosure. Moreover, novel technical features can be formed by combining the technical approaches disclosed in the embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image display device comprising:
an image forming layer configured to form an image in an image display region; and
an image taking camera including an image taking lens, the image forming layer including a backlight including a through-hole, an image taking window portion formed on a light path of the image taking camera in the image forming layer at a position overlapping the image taking lens when seen in plan view, and a frame portion defining a peripheral edge of the image taking window portion,
wherein the image taking camera is disposed on a back face side of the image forming layer and facing a display surface side of the image forming layer, at a position within the image display region when the image forming layer is seen in plan view, with the image taking lens positioned inside the through-hole, and
assume that a focal length of the image taking camera is d, a distance from a back face of the backlight to a tip of the image taking lens is G, an angle of view of the image taking camera is θ, a thickness of the backlight is D1, and a length of a frame of the backlight is $B_{BL}$, an outer diameter $\varphi_{STH}$ of the frame portion satisfying a following condition;

$$\varphi_{STH} \geq 2*(d+G+D1)\tan(\theta/2)+2*B_{BL}.$$

2. The image display device according to claim 1, wherein the image taking camera further includes a notch portion.

3. The image display device according to claim 1, further comprising:
a fixing member for fixing the image taking camera to the image forming layer.

4. The image display device according to claim 1, wherein a surface of the backlight surrounding the through-hole includes at least one of an inclined surface and a curved surface.

5. The image display device according to claim 1, further comprising:
a light blocking material.

6. The image display device according to claim 1, wherein the image forming layer is a liquid crystal display panel.

7. An image display device comprising:
an image forming layer configured to form an image in an image display region; and
an image taking camera including an image taking lens, the image forming layer including a backlight including a through-hole, a first polarizer, a thin film transistor substrate, an image taking window portion formed on a light path of the image taking camera in the image forming layer at a position overlapping the image taking lens when seen in plan view, and a frame portion defining a peripheral edge of the image taking window portion, wherein
the image taking camera is disposed on a back face side of the image forming layer and facing a display surface side of the image forming layer, at a position within the image display region in a case where the image forming layer is seen in plan view, with the image taking lens positioned inside the through-hole, and
assume that a focal length of the image taking camera is d, a distance from a back face of the backlight to a tip of the image taking lens is G, an angle of view of the image taking camera is θ, a thickness of the backlight is D1, a thickness of the first polarizer is D2, a thickness of the thin film transistor substrate is D3, and a length of a frame of the thin film transistor substrate is $B_{PANEL}$, an outer diameter $\varphi_{STH}$ of the frame portion satisfies a following condition;

$$\varphi_{STH} \geq 2*(d+G+D1+D2+D3)\tan(\theta/2)+2*B_{PANEL}.$$

8. The image display device according to claim 7, wherein the image taking camera further includes a notch portion.

9. The image display device according to claim 7, further comprising:
a fixing member for fixing the image taking camera to the image forming layer.

10. The image display device according to claim 7, wherein a surface of the backlight surrounding the through-hole includes at least one of an inclined surface and a curved surface.

11. The image display device according to claim 7, further comprising:
a light blocking material.

12. The image display device according to claim 7, wherein the image forming layer is a liquid crystal display panel.

* * * * *